United States Patent
Oprasic et al.

(10) Patent No.: US 9,555,488 B2
(45) Date of Patent: Jan. 31, 2017

(54) MILLING INSERT

(75) Inventors: Amil Oprasic, Sandviken (SE); Leif Widin, Sandviken (SE); Stefan Roman, Sandviken (SE); Lennart Wihlborg, Ockelbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 252 days.

(21) Appl. No.: 12/420,492

(22) Filed: Apr. 8, 2009

(65) Prior Publication Data

US 2009/0285646 A1    Nov. 19, 2009

(30) Foreign Application Priority Data

May 13, 2008 (SE) .................................... 0801075-3

(51) Int. Cl.
*B23C 5/20* (2006.01)
*B23C 5/06* (2006.01)

(52) U.S. Cl.
CPC .................. *B23C 5/202* (2013.01); *B23C 5/06* (2013.01); *B23C 2200/082* (2013.01);
(Continued)

(58) Field of Classification Search
CPC .............. B23C 2210/203; B23C 2210/50; B23C 2210/54; B23C 5/165; B23C 5/20; B23C 5/202; B23C 5/205; B23C 2200/045; B23C 2200/0455; B23C 2200/08; B23C 2200/081; B23C 2200/085; B23C 2200/126; B23C 2200/323; B23C 2200/326; B23C 2200/0494; B23C 2200/082; B23C 2200/087; B23C 2200/201; B23C 2200/205; B23C 2200/162; B23C 2200/164; B23C 2200/203; B23C 2200/208; B23C 2210/0428; B23C 2210/045; B23C 2210/166; B12C 2200/125; B23B 2200/202; B23B 2200/204; B23B 2200/321; B23B 2200/208; B23B 2200/083; B23B 2200/085; B23B 2200/123; B23B 2200/125; B23B 2200/126; Y10T 407/23; Y10T 407/24; Y10T 407/2268
(Continued)

(56) References Cited

U.S. PATENT DOCUMENTS 3,786,540 A  * 1/1974 Lundgren ..................... 407/113
4,318,645 A  * 3/1982 McCreery ..................... 407/114
(Continued)

FOREIGN PATENT DOCUMENTS

EP     0707911 A1 *  4/1996
EP     1 872 889 A1   1/2008
(Continued)

OTHER PUBLICATIONS

English translation of Notice of Reasons for Rejection for Japanese Patent Application No. 2009-115566, dated May 7, 2013.
(Continued)

*Primary Examiner* — Jennifer Swinney
(74) *Attorney, Agent, or Firm* — Morgan, Lewis & Bockius LLP

(57) ABSTRACT

A milling insert, including an upperside, an underside, and a reference plane parallel thereto. A plurality of indexable cutting edges are formed along a peripheral borderline in transitions between at least the upperside and a number of clearance surfaces. Each cutting edge includes a chip-removing main edge and a surface-wiping secondary edge. The main edge, from a first end of the main edge adjacent to the secondary edge, declines toward the underside of the milling insert and then, from a lowest part, rises toward an
(Continued)

opposite second end of the main edge. The secondary edge is inclined at an angle (ε) in relation to the reference plane as viewed perpendicularly to the clearance surface of the secondary edge, such that a first end of the secondary edge connected to the main edge is situated on a lower level than the opposite, second end of the secondary edge.

20 Claims, 8 Drawing Sheets

(52) U.S. Cl.
CPC .. *B23C 2200/087* (2013.01); *B23C 2200/201* (2013.01); *B23C 2200/205* (2013.01); *B23C 2200/208* (2013.01); *B23C 2210/045* (2013.01); *B23C 2210/0428* (2013.01); *B23C 2210/166* (2013.01); *Y10T 407/235* (2015.01)

(58) Field of Classification Search
USPC .................. 407/113, 114, 115, 116
See application file for complete search history.

(56) References Cited

U.S. PATENT DOCUMENTS

| | | | | |
|---|---|---|---|---|
| 4,344,725 | A * | 8/1982 | Seidel | 407/114 |
| 5,597,271 | A * | 1/1997 | Men et al. | 407/113 |
| 5,803,674 | A * | 9/1998 | Satran et al. | 407/42 |
| 5,807,031 | A * | 9/1998 | Arai et al. | 407/113 |
| 5,904,450 | A * | 5/1999 | Satran et al. | 407/113 |
| 6,196,771 | B1 * | 3/2001 | Andersson | 407/113 |
| 6,530,726 | B2 * | 3/2003 | Nelson | 407/114 |
| 6,543,970 | B1 * | 4/2003 | Qvarth et al. | 407/114 |
| 7,306,409 | B2 * | 12/2007 | Stabel et al. | 407/113 |
| 7,513,717 | B2 * | 4/2009 | Engstrom et al. | 407/113 |
| 7,604,441 | B2 * | 10/2009 | Bhagath | 407/113 |
| 8,267,623 | B2 * | 9/2012 | Park et al. | 407/113 |
| 2004/0202515 | A1 * | 10/2004 | Satran | B23C 5/12 407/113 |
| 2004/0208714 | A1 | 10/2004 | Stabel et al. | |
| 2008/0273930 | A1 * | 11/2008 | Svenningsson | B23C 5/10 407/49 |

FOREIGN PATENT DOCUMENTS

| | | |
|---|---|---|
| JP | 04 097609 U | 8/1992 |
| JP | 7-60512 | 3/1995 |
| JP | 8-243829 | 9/1996 |
| JP | 2001157904 A | 6/2001 |
| JP | 2004-314301 | 11/2004 |
| JP | 2010-524709 | 7/2010 |
| WO | WO 98/01253 | 1/1998 |
| WO | WO 01/28722 A1 | 4/2001 |
| WO | WO 2007/004206 A1 | 1/2007 |
| WO | WO 2008/132757 A1 | 6/2008 |
| WO | WO 2008/132757 | 11/2008 |

OTHER PUBLICATIONS

Office Action dated Apr. 1, 2014 from the Japanese Patent Office in counterpart application No. 2009-115566.

* cited by examiner

__US 9,555,488 B2__

1

MILLING INSERT

This application claims priority under 35 U.S.C. §119 to Swedish Patent Application No. 0801075-3, filed on May 13, 2008, which is incorporated by reference herein in its entirety.

FIELD OF THE INVENTION

The present invention relates generally to a milling insert of the type that includes an upperside, an underside, a reference plane parallel to the same sides, and a number of alternately applicable cutting edges, which are formed along a peripheral borderline in transitions between at least the upperside and a number of clearance surfaces, and which individually include a chip-removing main edge and a surface-wiping secondary edge, which—as viewed in planar view—forms an obtuse angle with the main edge. The main edge of the individual cutting edge, from a first end adjacent to the co-operating secondary edge, first declines toward the underside of the milling insert and then, from a lowest point, again rises toward an opposite end.

The invention is particularly suitable for and advantageous in connection with double-sided milling inserts for face milling, i.e., milling inserts, the uppersides and undersides of which are identical in respect of the insert geometry and individually include three or more cutting edges being alike, which are alternately applicable by indexing (rotation) of the milling insert.

BACKGROUND OF THE INVENTION

Milling tools for chip removing machining of, above all, workpieces of metal (steel, aluminum, titanium, etc.) are generally composed of a rotatable basic body or milling-cutter body, most often of steel, as well as a plurality of replaceable milling inserts of cemented carbide, ceramics or the like. Because the milling inserts are expendable materials as a consequence of being worn fairly fast, it is most often desirable to form the same with as large a number of cutting edges as possible. For this reason, the milling inserts may be carried out double-sided so far that the underside is formed with the same number of cutting edges as the upperside, while doubling the number of cutting edges in comparison with single-sided milling inserts. Therefore, milling cutters for face milling are often equipped with milling inserts that are double-sided and have a quadratic basic shape with four cutting edges, i.e., four pairs of co-operating main edges and secondary edges, along the upperside as well as the underside, and which are mounted at an effective setting angle of approximately 45° in the milling-cutter body. In such cases, the main edge and the secondary edge form a nominal angle of 135° with each other.

The problems forming the basis of the present invention are associated with double-sided face milling inserts of the type that is denominated "negative," and which are formed with clearance surfaces that extend perpendicularly to the neutral plane to which the uppersides and undersides are parallel. In order to provide requisite clearance between, on one hand, the clearance surface present (rotationally) behind the active, surface-wiping secondary edge, and on the other hand the generated, plane surface of the workpiece, the milling insert has to be mounted with a negative axial tipping-in angle in the milling-cutter body. Simultaneously, the milling insert also has to have a negative radial tipping-in angle in order to provide clearance between, on one hand,

2 the clearance surface behind the chip-removing main edge, and on the other hand the generally cone-shaped surface generated by the same. Just the negative axial tipping in of the milling insert gives, on one hand, rise to greater axial cutting forces than those cutting forces that arise when the milling inserts are positively tipped-in, and on the other hand problems with the chip formation as well as the chip evacuation difficult to master, among others so far that the chips tend to be directed obliquely downward toward the generated plane surface rather than clear from the same.

Before the background of the invention is further described, it should be pointed out that certain fundamental concepts found in this document, e.g., "clearance angle," can be of either a nominal or an effective character. When, for instance, a clearance angle is "nominal," the same only relates to the milling insert as such, i.e., without conjunction with the milling-cutter body, but if the same is "effective," reference is made to the clearance angle that occurs when the milling insert is mounted in the rotatable milling-cutter body and performs chip removal.

The problems caused by the negative axial and radial, respectively, tipping in are particularly accentuated in milling cutters having the older type of milling inserts, which have a prismatic basic shape and include cutting edges, the main edges of which are straight and pair-wise parallel along common clearance surfaces, as well as also the secondary edges are straight and pair-wise parallel along the common clearance surfaces thereof. In this case, the main edges will be subjected to particularly great cutting forces and give rise to considerable chip formation and chip evacuation problems, because the milling inserts have to be tipped into an equally great negative axial angle, as the desired effective clearance angle between the generated plane surface of the piece to be machined and the clearance surface behind the surface-wiping secondary edge.

More recently, a number of proposal of solutions of the above-mentioned problems have appeared. Thus, in U.S. Pat. No. 5,807,031, a double-sided, quadratic face milling insert is disclosed, the chip-removing main edges of which are inclined in relation to the neutral plane of the milling insert, more precisely in such a way that the individual main edge, counted from a first end adjacent to the co-operating secondary edge, first declines toward the underside of the milling insert and then, from a lowest point, again rises toward an opposite end. In such a way, the above-mentioned problems are solved in a general way, so far that the effective axial angle of the proper main edge is reduced from a relatively great negative value to a smaller, more positive value, in spite of the milling insert, per se, (i.e., the neutral plane of the milling insert) has a sufficiently great negative axial angle in order to provide the requisite clearance behind the surface-wiping secondary edge. However, this known milling insert is, nevertheless, associated with a number of shortcomings and disadvantages. One such disadvantage is that the two secondary edges along a common clearance surface of each corner of the milling insert are still straight and mutually parallel. This means that the transition between the individual secondary edge and the appurtenant main edge forms a fairly sharp corner (as viewed nominally in side view), so far that the angle between the secondary edge and the declining main edge is considerably smaller than 180°. Thus, in the preferred embodiment, this angle amounts to 165°-170°. Because the corner transition between the main edge and the secondary edge is the part of the milling insert being absolutely most exposed to, among other things, forces, heat and erosion, the fairly sharp corner of the same means that the milling insert becomes fragile and gets a limited service life associated with the wear thereof. In addition, the wear of such a sharp corner easily gives rise to visible stripes in the finished, wiped-off surface, more precisely in the form of shallow, per se, but nevertheless most detrimental grooves in the surface being plane in other respects. In other words, the finish of the generated surface becomes rather mediocre. Another disadvantage is that the peripheral borderline, which surrounds the upperside (and the underside, respectively), is a single continuous cutting-edge line. Thus, the cutting-edge line of the individual main edge transforms directly into an adjacent, non-co-operating secondary edge—or alternatively via diminutive part edges along facet surfaces between the clearance surfaces of the main edge and the secondary edge—the secondary edges forming the uppermost portions of the upperside, i.e., no other points along the upperside are situated at a greater distance from the neutral plane than the secondary edges. This is destructive considering that just the secondary edges are crucial for the finish of the generated surface, and therefore should be sharp or in any case undamaged as long as possible. Because the secondary edges in the known milling insert stick up in relation to the rest of the upperside, the same are subject to miscellaneous risks of damage. Thus, damage may easily arise during the handling of the milling inserts, e.g., when the same are placed on metal tables or the like in connection with indexing and replacements. Because each active main edge directly transforms into an adjacent, inactive secondary edge, there is, in addition, a risk that the removed chips hammer against and damage the secondary edge not yet used. Moreover, the declining or downwardly leaning part of the main edge, which extends from the co-operating secondary edge toward the lowermost point of the main edge, will have a length that is considerably greater than half the length of the main edge. This means that the material in the milling insert becomes considerably thinner in the area of the lowermost point or depression of the main edge, whereby the strength of the milling insert is impaired. This detriment will be particularly marked when the milling insert requires large clearances.

A face milling insert that resembles the milling insert described above and which is essentially impaired with the same disadvantages as the same, is previously described in U.S. Pat. No. 7,306,409.

The present invention aims at obviating the above-mentioned disadvantages of the previously known milling inserts and at providing an improved milling insert. Therefore, an object of the invention to provide a milling insert, and in particular a double-sided face milling insert, the most sensitive parts of which, i.e., the corner transitions between co-operating secondary and main edges are strong and well functioning, in spite of the fact that the main edges of the milling insert can work with effective rake angles that are moderately negative or even positive in spite of the effective clearances behind the secondary edges being ample.

Another object of the invention is to provide a milling insert, in which the risk of damage to the sensitive secondary edges is reduced to a minimum.

Yet another object of the invention is to provide a milling insert, in which the desired, cutting-technical improvements can be attained without the milling insert being weakened by unnecessary reduction of the amount of material (cemented carbide) in the same.

Still another object of the invention is to provide a double-sided face milling insert particularly suitable for fine milling or semi-fine milling, the main edges of which initially decline at a greater angle than the remaining parts of the same, in order to, in such a way, additionally refine the qualities of the milling insert in connection with fine milling, i.e., milling with small or moderate cutting depths.

SUMMARY OF THE INVENTION

In an embodiment, the invention provides a milling insert, including an upperside, an underside, and a reference plane parallel to the upperside and the underside. A plurality of indexable cutting edges are formed along a peripheral borderline in transitions between at least the upperside and a number of clearance surfaces. Each cutting edge includes a chip-removing main edge and a surface-wiping secondary edge, the secondary edge forming an obtuse angle with the main edge as viewed in planar view from the upperside. The main edge, from a first end of the main edge adjacent to the secondary edge, first declines toward the underside of the milling insert and then, from a lowest part, rises toward an opposite second end of the main edge. The secondary edge is inclined at an angle ($\epsilon$) in relation to the reference plane as viewed perpendicularly to the clearance surface of the secondary edge, such that a first end of the secondary edge connected to the main edge is situated on a lower level than the opposite, second end of the secondary edge.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
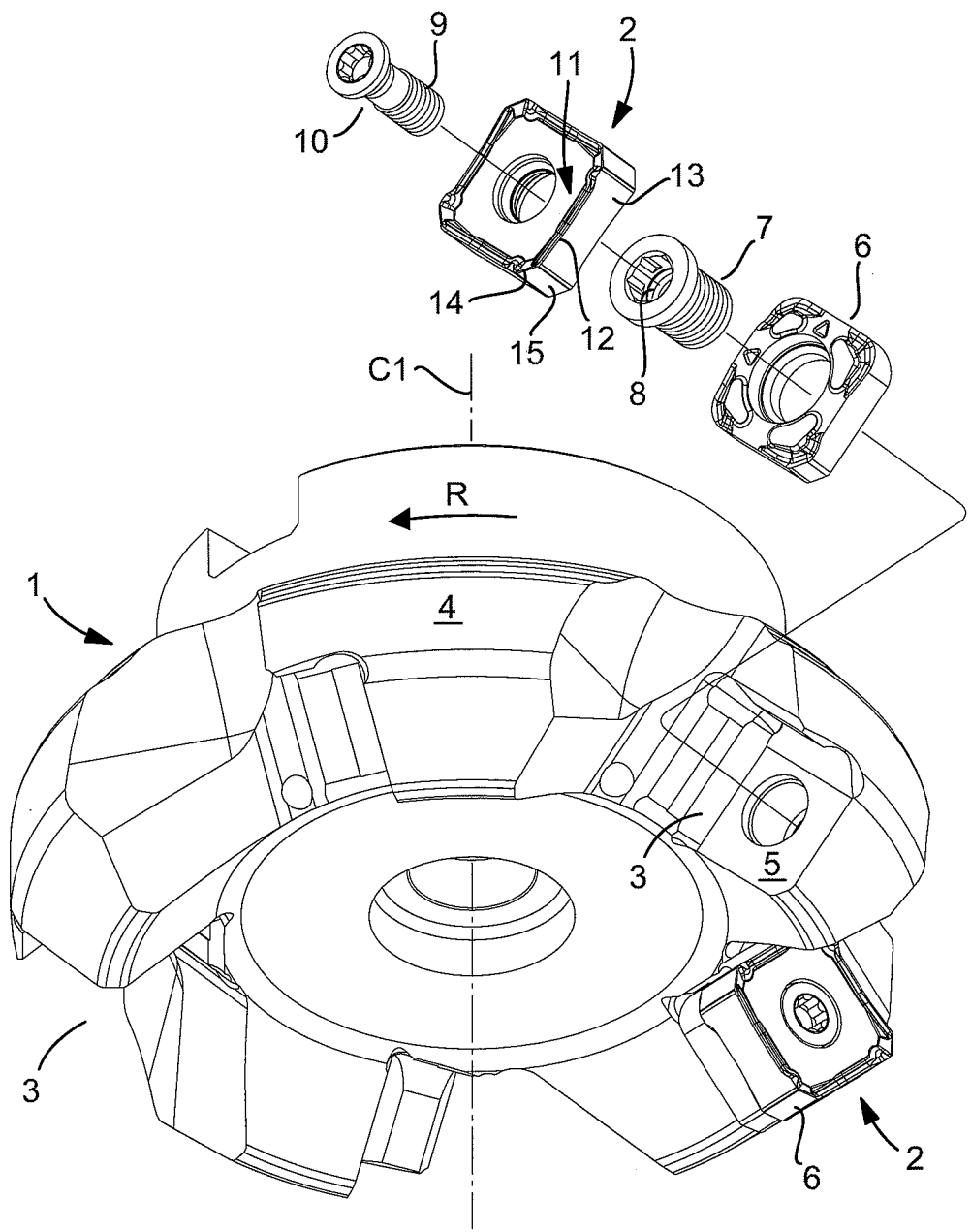
FIG. 1 is a perspective exploded view showing a milling tool in the form of a face mill equipped with milling inserts according to an embodiment of the invention.
Figures 2, 3:
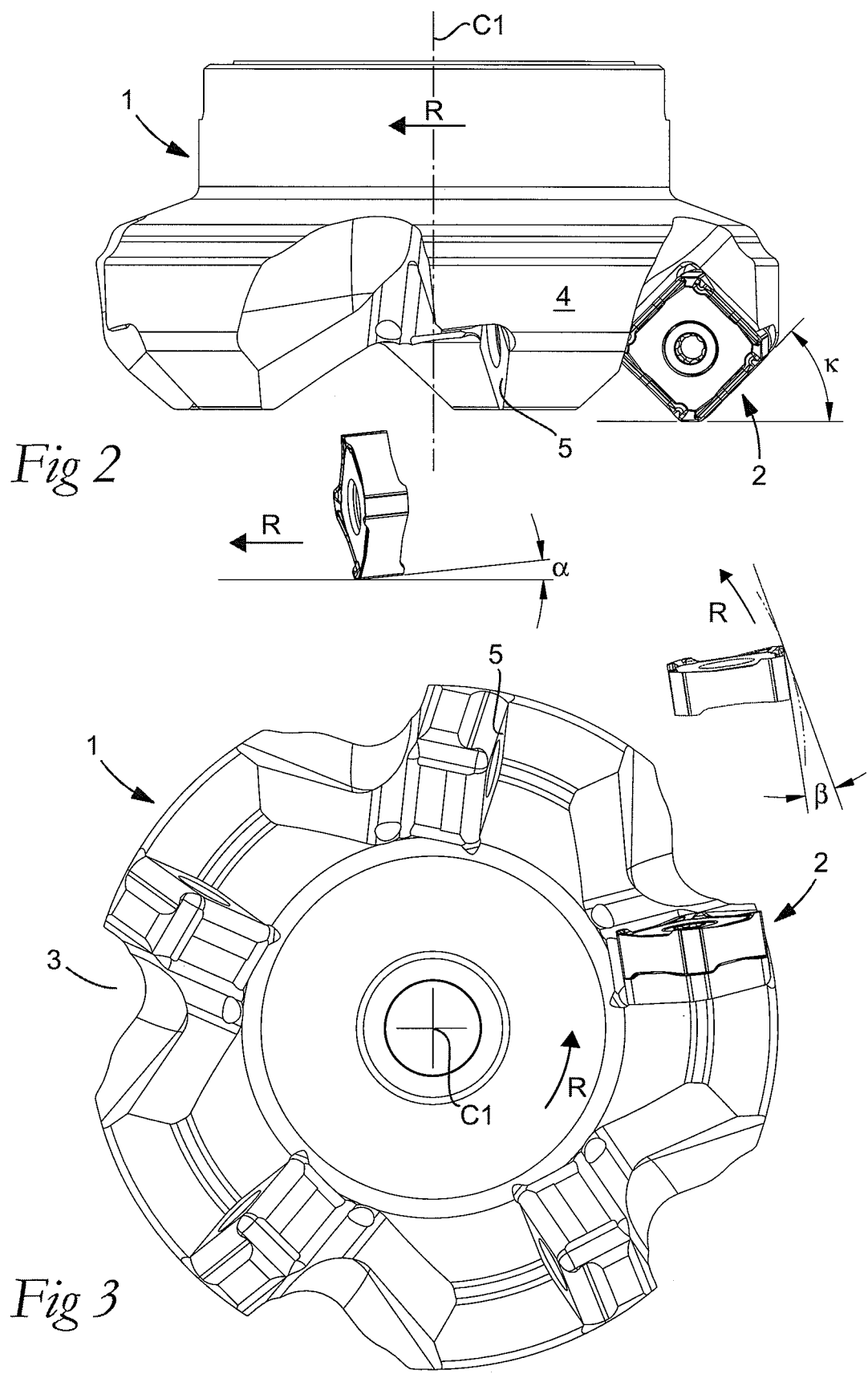
FIG. 2 is a side view of the basic body of the milling cutter illustrating the axial tipping in of the individual milling insert into the milling-cutter body.
FIG. 3 is a planar view from below illustrating the radial tipping in of the milling insert.

In FIGS. 1-3, a milling tool is exemplified in the form of a face mill, which includes a basic body or milling-cutter body 1 and a number of replaceable milling inserts 2 (only one of which is shown mounted in the milling-cutter body). The milling-cutter body 1 is rotatable in the direction of rotation R around a center axis designated C1, and includes, in a front or lower end, a number of chip pockets 3 for each one of the milling inserts 2. In the example, the number of chip pockets amounts to five. The chip pockets 3 are recessed in a rotationally symmetrical envelope surface 4 and include a seating or insert seat, which is represented by a plane bottom surface 5. Although it is fully possible to apply the individual milling insert directly against the bottom surface 5, in this case a shim plate 6 is arranged between the bottom surface 5 and the milling insert 2. This shim plate is kept semi-permanently fixed against the bottom surface 5 by a tubular screw 7, in the female thread 8 of which a male thread 9 of a screw 10 can be tightened for the fixation of the proper milling insert 2.

Figure 4:
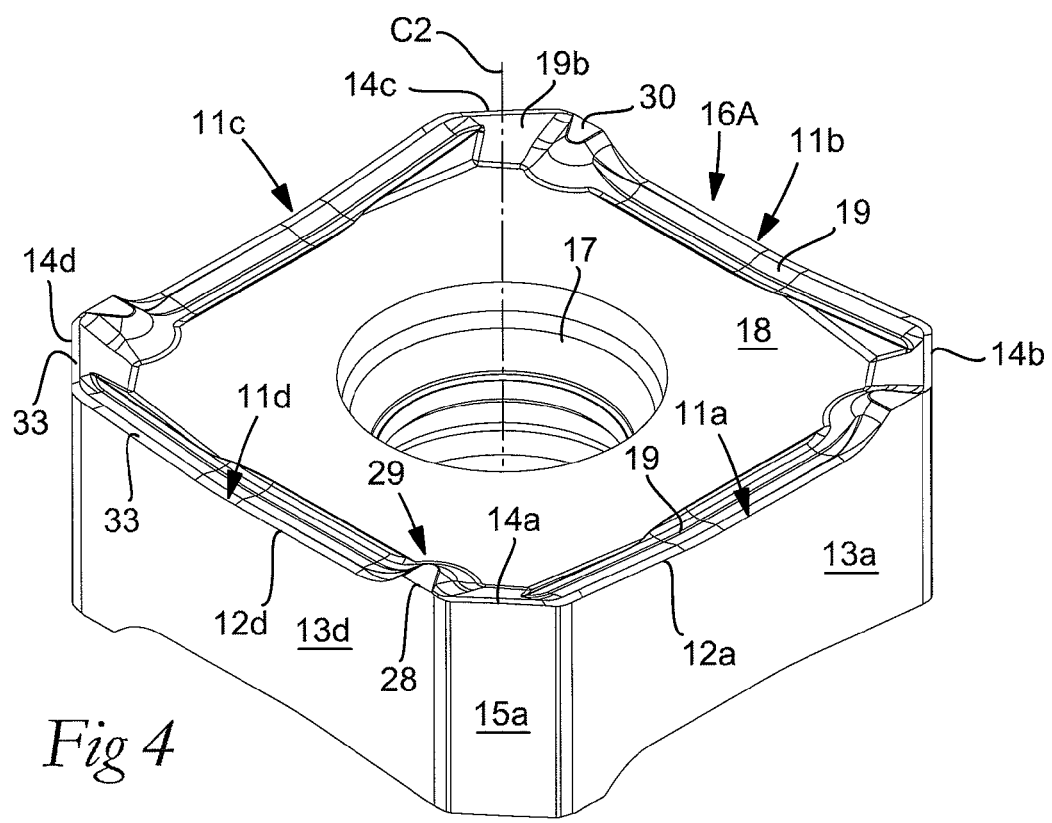
FIG. 4 is a perspective view showing the upperside of the milling insert.
Figure 5:
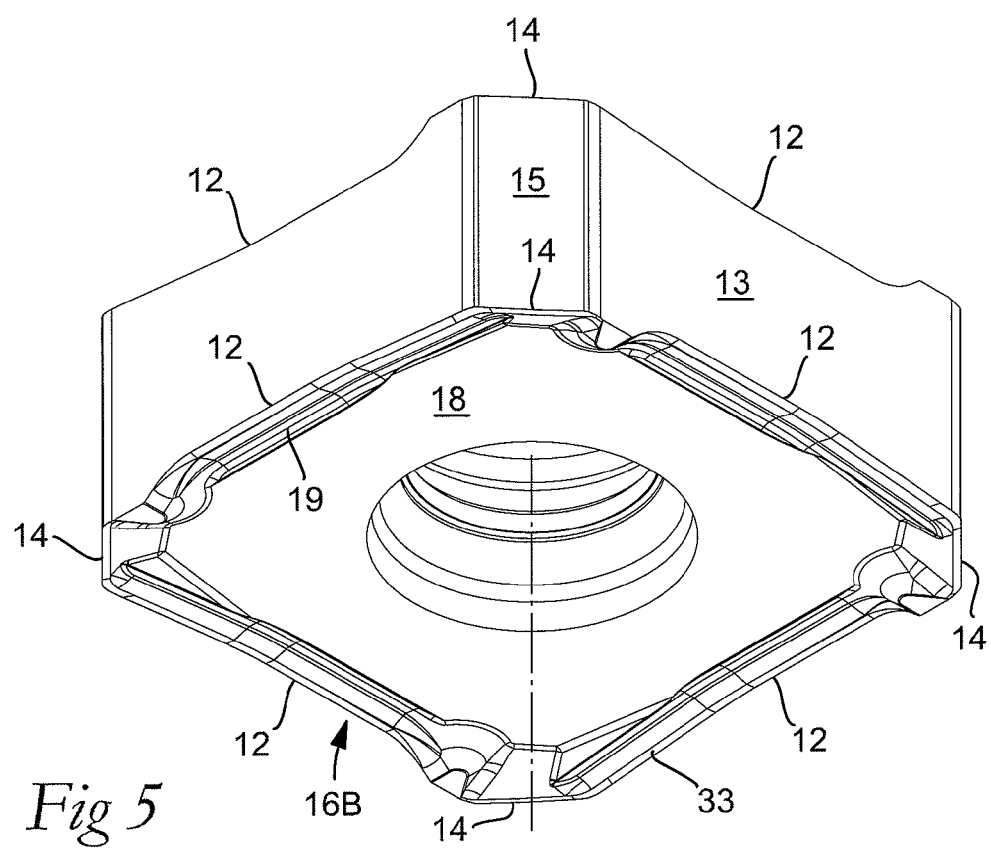
FIG. 5 is a perspective view showing the underside of the milling insert.
Figure 6:
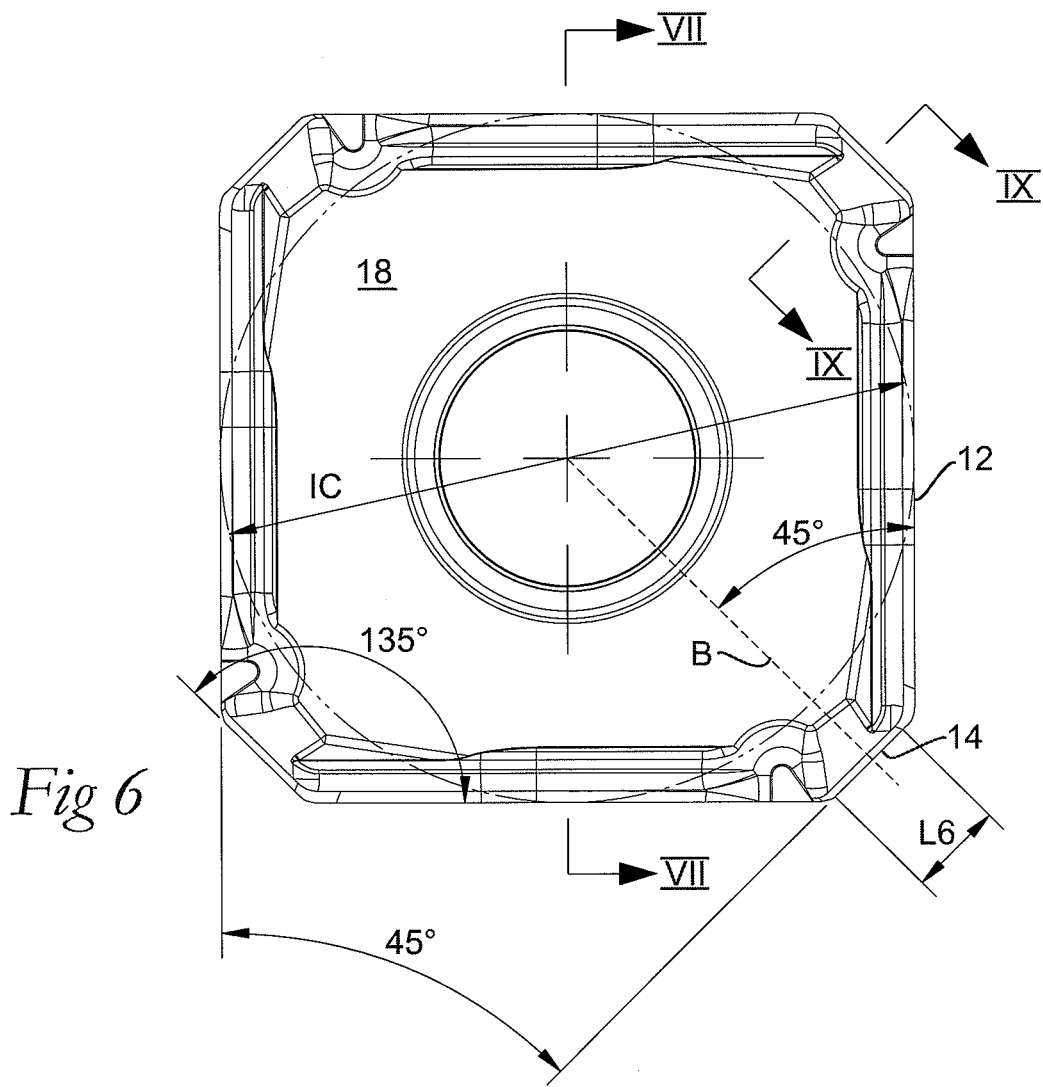
FIG. 6 is a planar view from above of the milling insert.
Figure 7:
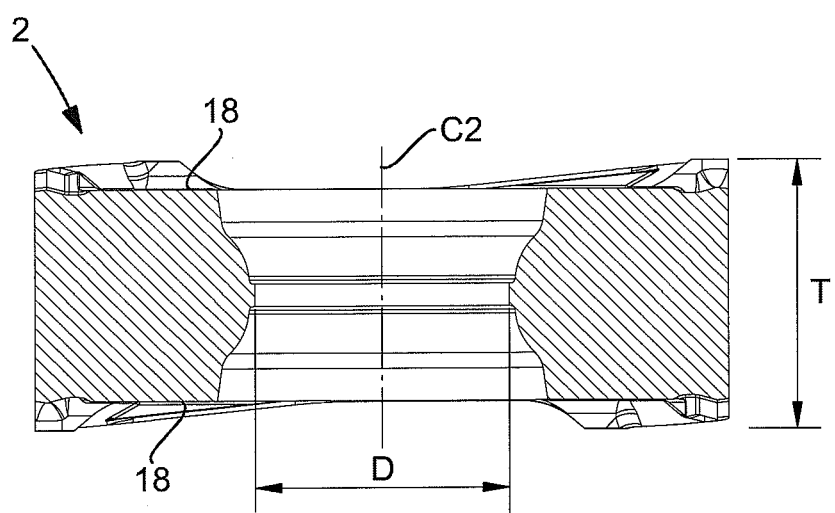
FIG. 7 is a longitudinal section VII-VII in FIG. 6.

As is seen in FIGS. 4-6, the milling insert 2 has a quadratic basic shape and includes four cutting edges 11, each one of which includes a chip-removing main edge 12 adjacent to a first clearance surface 13, as well as a surface-wiping secondary edge 14 (at times denominated "wiper edge") adjacent to a second clearance surface 15. Because of the milling insert being double-sided, the same has to be mounted in a special tipping-in position in the milling-cutter body 1. Thus, in FIG. 2, it is seen how the bottom surface 5, which ultimately determines the solid geometrical position of the milling insert 2 in the milling-cutter body does not run parallel to the center axis C1, but is tipped downward/rearward in relation to the center axis C1 as viewed in the direction of rotation R. In such a way, an effective clearance is provided between the clearance surface 15 present under, or rotationally behind, the secondary edge 14 and the plane surface generated and leveled out by the secondary edge 14. In order to, in an analogous way, provide a clearance between the clearance surface 13 of the main edge 11 and the cone-shaped surface generated by the main edge, the bottom surface 5 is furthermore tipped rearward/outward at a radially negative tipping-in angle (see FIG. 3). In order for the clearance of the surface 15 to be well functioning, the axial tipping-in angle should amount to at least 4°, but may be greater. In the example, the axial tipping-in angle amounts to 6°, which yields an effective clearance angle $\alpha$ of approx. 6° (see FIG. 2). The effective clearance angle $\alpha$ is also affected by the radial tipping-in angle, though marginally. The radial tipping-in angle may amount to 8° or more. The axial and radial tipping-in angles together determine the effective clearance angle $\beta$ behind the main edge (see FIG. 3). Suitably, $\beta$ should be within the interval of 8°-20°.

It should be pointed out that the milling-cutter body 1 advantageously is manufactured of steel or aluminum, while the replaceable milling inserts 2 are manufactured of cemented carbide, ceramics, or other suitable hard and wear-resistant materials.

Reference is now made to FIGS. 4-13, which in detail illustrate the milling insert 2 only, i.e., without conjunction with the milling-cutter body 1. The milling insert includes an upperside 16A and an underside 16B, the topographic or cutting geometrical design of which corresponds with the design of the upperside 16A. Generally, the upperside and the underside are parallel to a reference plane RP (see FIG. 8), which in this case is situated halfway between the same, and which therefore also forms the neutral plane of the milling insert. The reference plane RP extends perpendicularly to the center axis C2 of the milling insert, which in this case, when the milling insert is formed with a through hole 17 for the screw 10, also forms a center axis of the same hole. As previously pointed out, the milling insert has a quadratic basic shape and includes four cutting edges 11, each one of which includes a main edge 12 and a surface-wiping secondary edge 14. In FIG. 4, the reference designations 11, 12, 13, 14 and 15 are provided with the suffixes a, b, c and d in order to separate an active cutting edge from the inactive ones. The corresponding reference designations in FIG. 5 lack such suffixes. Thus, in FIG. 4 the cutting edge 11a is meant be active, the main edge 12a and the secondary edge 14a co-operating with each other during the milling operation, while the other three cutting edges, designated 11b, 11c, 11d, are inactive. In FIG. 4, the active main edge 12a is shown adjoining an inactive secondary edge 14b at the same time as the active secondary edge 14a adjoins an inactive main edge 12d. It should also be pointed out that in this case, the clearance surfaces 13, 15 are plane.

In the upperside 16A as well as the underside 16B, a plane surface 18 is included, which forms the contact or base surface of the milling insert against the shim plate 6. Peripherally outside the contact surface 18, chip surfaces 19 (see FIGS. 4 and 5) are formed, which together with the upper portions of the clearance surfaces 13, 15 delimit the different cutting edges. In order to separate the clearance surfaces 13, 15 adjacent to the active cutting edge 11a from the other clearance surfaces, the same have been provided with the suffix a in FIG. 4. In this connection, it should also be pointed out that the reference designations 12, 14 point at the cutting-edge lines formed in the transitions between the clearance surfaces and the chip surfaces.

In the embodiment shown, not only the clearance surfaces 13, but also the clearance surfaces 15, extend perpendicularly to the reference plane RP (and are therefore also running parallel to the center axis C2). Because the effective setting angle $\kappa$ of the milling inserts (see FIG. 2) in this case should amount to approximately 45°, the pair-wise co-operating secondary and main edges 14, 12 and the respective clearance surfaces 15, 13 connected to the same form an obtuse, nominal angle of 135° with each other as viewed in a planar view (see FIG. 6). Furthermore, the secondary edge 14 extends perpendicularly to a bisector B, which in turn forms an angle of 45° with each pair of main edges 12 and clearance surfaces 13 running toward a common, individual corner of the milling insert.

Figure 8:
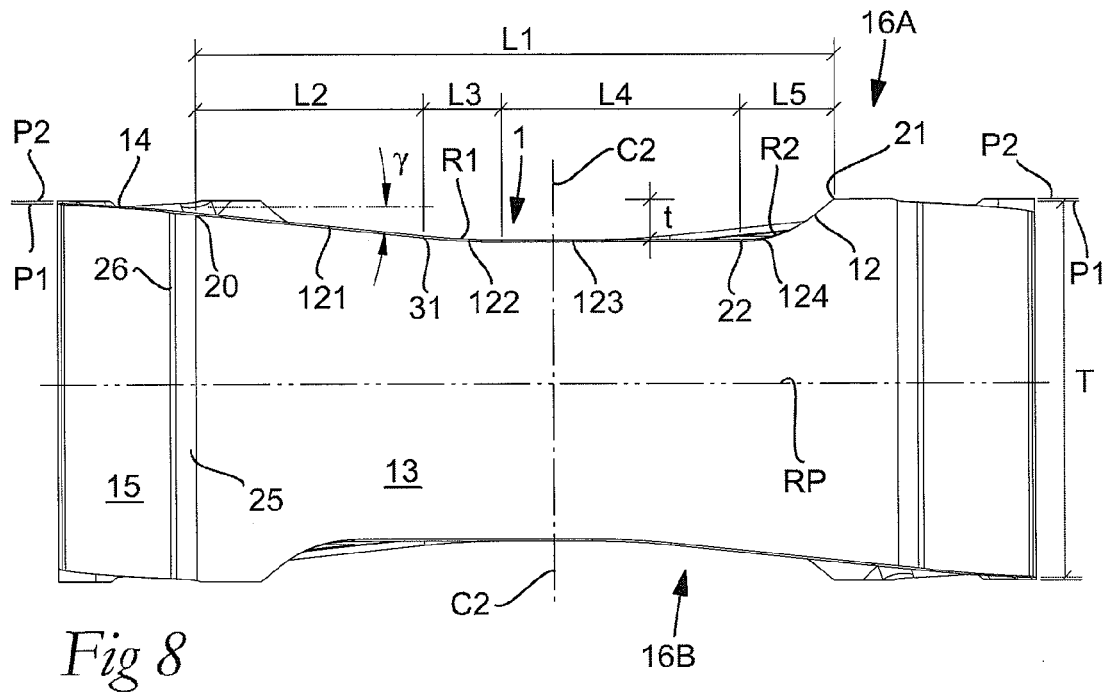
FIG. 8 is an enlarged side view of the milling insert.
Figure 9:
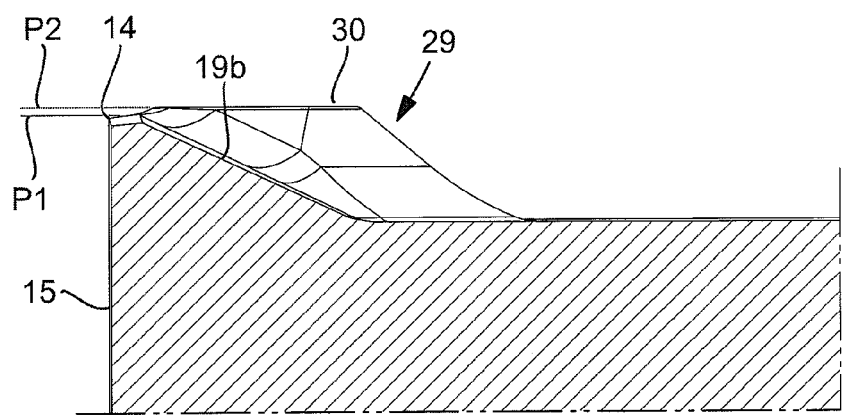
FIG. 9 is an enlarged section IX-IX in FIG. 6.

In FIG. 8, it is seen that the individual main edge 12 extends between first and second ends 20, 21 and has a total length designated L1. From the first end 20, the main edge declines in the downward direction against the underside 16B of the milling insert, more precisely at an angle $\gamma$, in order to subsequently, from a lowest point 22, again rise toward the opposite second end 21. In FIGS. 8 and 9, P1 further designates a plane parallel to the reference plane RP.

As previously has been pointed out, the secondary edges of the known milling inserts are parallel to the neutral plane of the milling inserts and form the portions of the upperside and of the underside, respectively, situated highest or farthest from the neutral plane.

Figure 10:
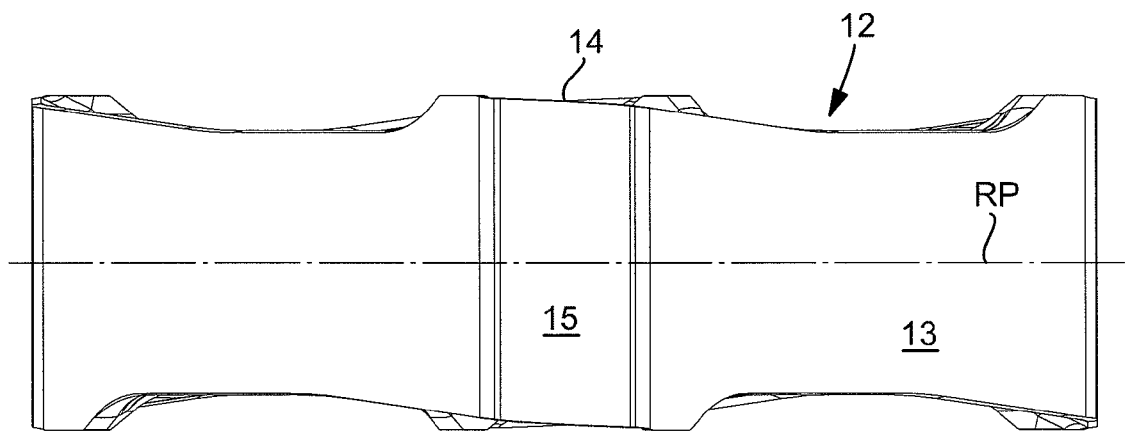
FIG. 10 is a side view showing the milling insert diagonally in the direction of the bisector of the individual corner.
Figure 11:
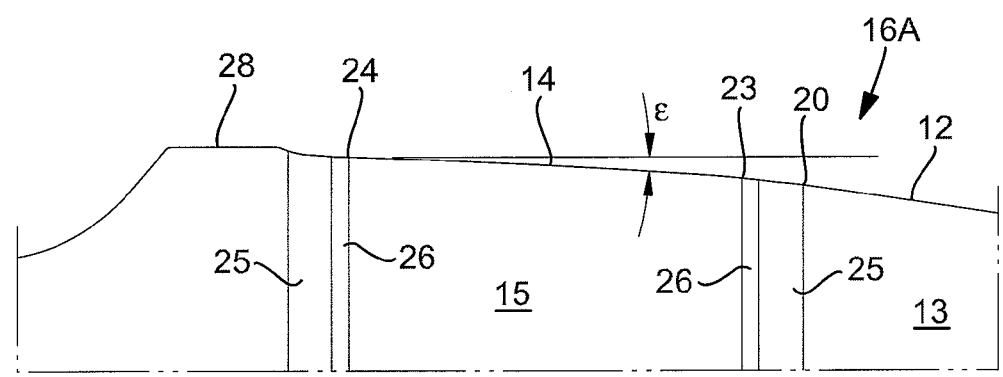
FIG. 11 is a detailed view on an enlarged scale illustrating the individual secondary edge of the milling insert.
Figure 12:
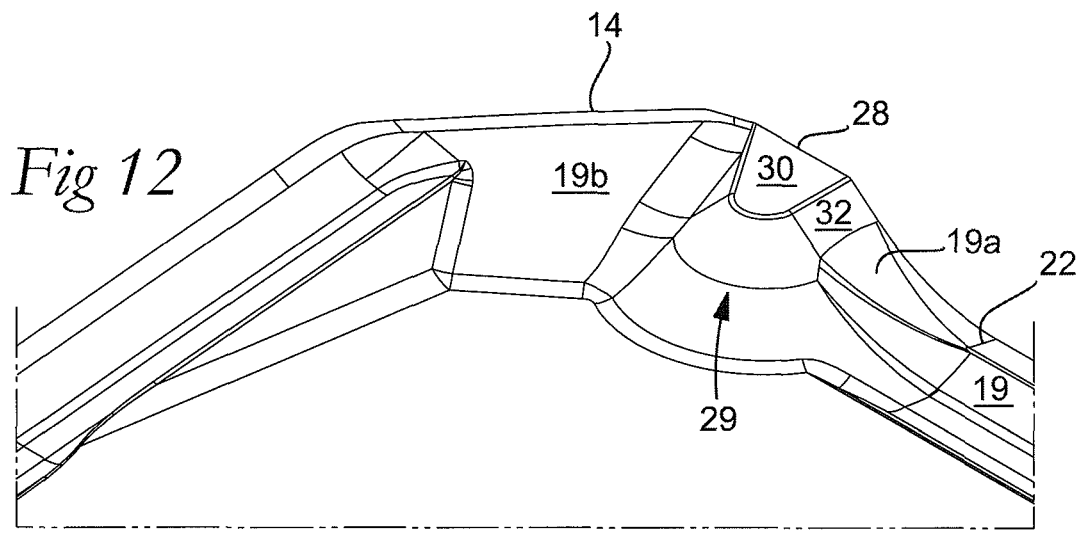
FIG. 12 is a partial perspective view of a corner of the milling insert.

Reference is now made to FIGS. 10 and 11, which show how the individual secondary edge 14 of the milling insert according to an embodiment of the invention is inclined at a moderate angle $\epsilon$ in relation to the neutral plane RP of the milling insert, more precisely in such a way that a first end 23, which connects to the main edge 12, is situated on a lower level than the opposite, second end 24. In the example, the angle $\epsilon$ between the secondary edge and the neutral plane amounts to 3°. In this connection, it should be pointed out that the cutting edges 12, 14 transform into each other via one or more radius transitions. In the example, the radius transitions are shown in the form of two convex part surfaces 25, 26 situated between the clearance surfaces 13, 15 of the cutting edges. As is clearly seen in FIG. 11, the described inclination of the secondary edge 14 entails that the most exposed part of the milling insert, viz. the corner transition between the secondary edge and the main edge, will lack the abrupt corner that will be the result when the cutting edges—as viewed in side view—mutually form an angle being considerably smaller than 180°. More precisely, the secondary edge 14 and the part edge 121 transform into each other along a substantially straight (or utmost slightly cambered) cutting-edge line as viewed from the side in the view according to FIG. 8. In other words, the two cutting-edge lines transform into each other along a harmonic transition line, which strengthens the corner transition and imparts to the milling insert an increased service life.

Here, it should be interposed that the plane P1 is orientated in such a way that the uppermost end points 24 of all four secondary edges 14 are in the plane P1. In other words, the level of the plane P1 in relation to the neutral plane RP is determined by the axial distance between the same and each end point 24.

Although ϵ in the example amounts to exactly 3°, this angle may vary provided that it amounts to at least 1°. On the other hand, the angle should not be more than 7°. Advantageously, the angle ϵ is within the interval of 2°-5°.

Figure 13:
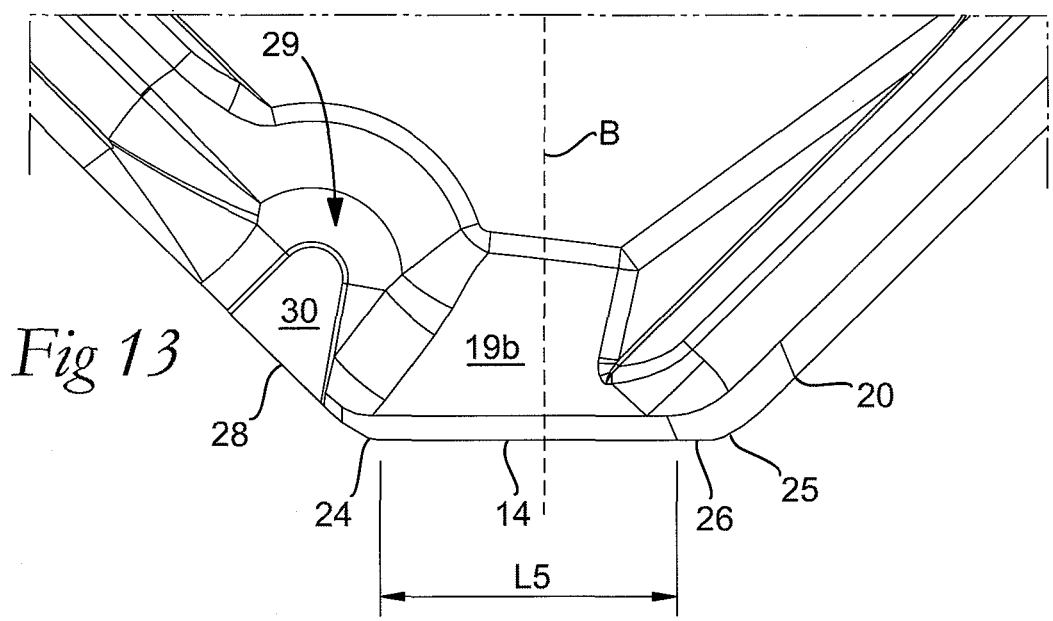
FIG. 13 is a partial planar view from above of the same corner.
Figure 14:
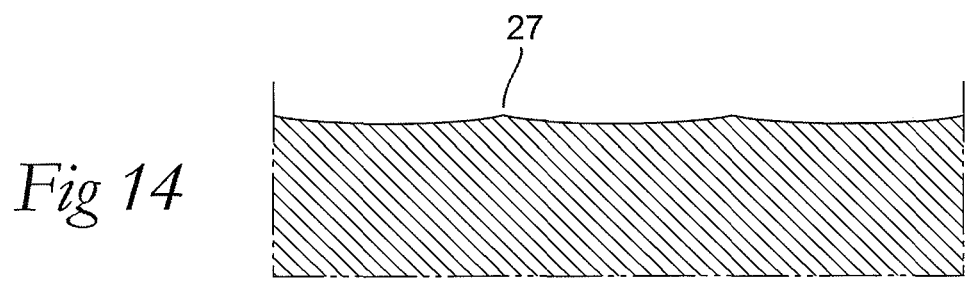
FIG. 14 is a schematic section showing the surface structure that can be obtained by a secondary edge having a convex camber.
Figure 13B:
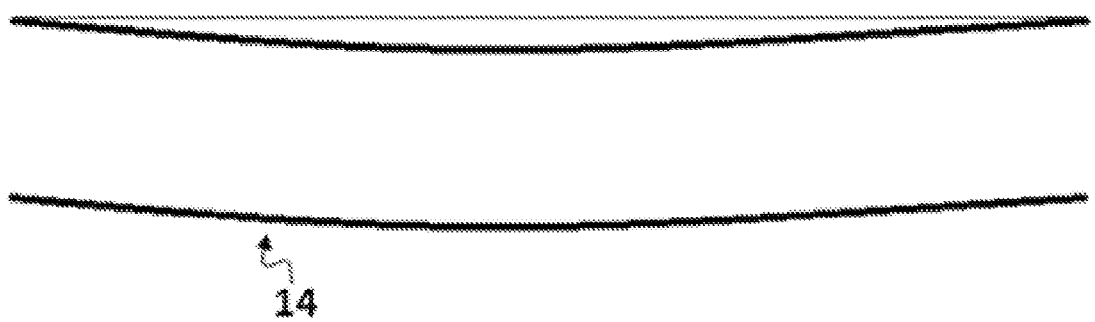
FIG. 13B illustrates a magnified view of a portion of a secondary edge according to one embodiment.

To the naked eye, the secondary edge 14 appears as being straight, not only in the planar views according to FIGS. 6 and 13, but also in the enlarged side view according to FIG. 11. However, in practice, the secondary edge may have other shapes than truly linear, at least in one of the co-ordinate directions. In particular, the same may be convexly arched as viewed in planar view according to FIG. 13 and FIG. 13B. In such a way, the generated, plane surface of the piece to be machined can be given an advantageous surface structure, which is illustrated in FIG. 14. Instead of leaving diminutive, lowered chutes or ditches in the surface, as is the case when the secondary edge is straight and transforms into the main edge via a comparatively acute bump, diminutive crests 27 invisible to the eye are formed between, in other respects, utmost slightly concave surface fields, which together are experienced as a plane and smooth surface. It is also possible to give the cutting-edge line 14 a slightly convex shape as viewed in the side view according to FIG. 11. In the last-mentioned case, the angle ϵ is defined by a chord extending between the end points 23 and 24 to the arc line that constitutes the secondary edge.

Another significant difference between the milling insert according to the present invention and the known milling inserts is that the borderline, along which the different cutting edges extend in the first case, is partially interrupted by non-chip-removing edge lines 28 (see FIGS. 11-13), whereas the cutting edges of the known milling inserts extend along one single, continuous edge line for chip removal. In other words, all cutting edges transform directly into each other in the known milling inserts, while each individual main edge, e.g., the main edge 12d according to FIG. 4, ends at a certain distance from a neighboring, non-co-operating secondary edge 14a, and is spaced-apart from the same by the non-chip-removing edge line 28.

Inside the inactive edge line 28, a shoulder, in its entirety designated 29, is formed, the top surface of which is designated 30. As is seen in FIGS. 8 and 9, the top surfaces 30 of all four shoulders 29 of the milling insert are situated in a common plane P2, which is situated on a higher level than the plane P1, in which the highest end points 24 of the secondary edges 14 are situated.

In the shown, preferred embodiment, the top surface 30 of the shoulder is plane and extends inward from the outer edge line 28 flush with the clearance surface of the main edge, the same coinciding with the plane P2.

Reference is now made to FIG. 8, which illustrates the particular contour shape that the main edge 12 has between the two ends 20, 21 thereof. From the first end 20, a first part edge 121 extends up to transition point 31 at the beginning of an arched, second part edge 122, which forms a transition to a third part edge 123 that extends up to the point 22. The part edge 121 leans, as previously been pointed out, in relation to the neutral plane RP at an angle γ that in the example amounts to 6°, while the third part edge 123 in this case is substantially parallel to the neutral plane RP and forms the lowermost part of the main edge. In the example, the two part edges 121 and 123 are straight, although it is also possible to give one, or both, of them a slightly concave shape (or even a shape that may alternate between concave, straight and/or convex). In this connection, it should be pointed out that it is, per se, possible to form also the third part edge 123 at a certain, moderate angle in relation to the neutral plane RP. In any event, the angle should, in such a case, be considerably smaller than the angle γ. Although the angle γ in the example amounts to 6°, the same may vary upward as well as downward. However, it should amount to at least 3° and at most 10°. The second part edge 122, serving as a transition between the two part edges 121, 123 has a concave shape and in this case a radius R1 that amounts to 10 mm. The length L2 of the part edge 121 is, as is clearly seen in FIG. 8, less than half of the entire length L1 of the main edge 12. In the example, L2 amounts to approx. 36% of L1.

At the point 22, the part edge 123 transforms into a fourth part edge 124, which, like the part edge 122, has a concave arc-shape, but a comparatively small radius R2 that in the example amounts to 1.5 mm. The length L4 of the part edge 123 amounts to approximately 38% of the total length L1, while the length L3 amounts to approximately 12% of L1 and L5 to 14% of L1. The length L6 of the secondary edge 14 (see FIG. 6) amounts, in the example, to approximately 23% of the total length L1 of the main edge. In practice, this value should be within the interval of 15-35%, preferably 20-30%.

All above-mentioned measures relate to a concrete example of a milling insert, the IC measure of which (see FIG. 6) amounts to 13 mm, the milling insert having a thickness T (see FIG. 7) of 5.1 mm. The measure "t" by which the part edge 123 is countersunk in relation to the plane P1 amounts, in the example, to 0.4 mm, i.e., approximately 8% of the thickness T. This value should be within the interval of 5-12%, suitably 6-10%. It should also be pointed out that in this case, the diameter D of the hole 17 amounts to 4.8 mm. In this connection, L2 amounts to approx. 4 mm and L1 to 8.7 mm.

When the milling insert is used for fine milling (when the requirement of the surface finish is great) and the cutting depth is so great that at most the entire length L2 of the part edge 121 is utilized, the negative axial orientation of the cutting edge is reduced by γ°, i.e., in the example by 6°. This means that the main edge becomes comparatively easy-cutting, when the cutting depth is limited and the requirement of the surface finish is great. If the milling insert would be used for rough milling, the cutting depth may be so great that almost the entire length L1 of the main edge is utilized. However, in rough milling, the requirement of the surface finish is usually moderate or non-existent. Therefore, it is incidental that the third part edge 123 is parallel to the neutral plane RP. The advantage of locating the third part edge 123 parallel to the neutral plane is that a great amount of material in the milling insert can be retained in comparison with the alternative that the first part edge 121 would slope all the way up to a lowest point situated near the end 21, as is the case with the milling insert according to U.S. Pat. No. 5,807,031. In other words, the milling insert according to the present invention becomes stronger than the milling insert known by U.S. Pat. No. 5,807,031.

Inside the concave part edge 124, the chip surface 19 (see FIG. 12) forms a concavely arched surface 19*a*, which transforms into a side limiting surface 32 on the shoulder 29. The surface 32 extends up to the plane top surface 30 and forms, together with the surface 19*a*, a formation that may be compared to a "ski slope." Inside the secondary edge 14, the chip surface includes a plane part surface 19*b*, which leans downward at a fairly large angle (lacks designation) to the plane base surface 18 of the milling insert (see FIGS. 4, 9 and 12).

Although the cutting edges described above, per se, could be sharp, e.g., by grinding, in the preferred embodiment, the same are formed with so-called reinforcement bevels 33 (see FIGS. 4 and 5), i.e., utmost slender surfaces in the immediate connection with the respective clearance surfaces. In this context, it should also be mentioned that the milling insert may be direct-pressed in so far that it obtains the final shape thereof directly after pressing and sintering, and without needing to be after-treated by grinding or the like.

As has previously been pointed out, the inclination of the secondary edges of in the way described above entails that the most sensitive portions of the milling insert, viz. the corner transitions between the co-operating secondary and main edges, are strengthened most considerably. The inclination also means that the secondary edges decline downward from the shoulders serving as chip-hammering protection, whereby the same are less exposed to possible chips that may pass along the top surfaces of the shoulders. The fact that the top surfaces of the shoulders are situated at a higher level than the highest points of the secondary edges, decreases in addition the risk of damage to the secondary edges in connection with manufacture, handling and the like, because the milling insert can rest on the shoulders instead of the secondary edges. By terminating the initially declining part edge of the main edge at a limited distance from the co-operating secondary edge and let the same transform into a second part edge substantially parallel to the neutral plane, furthermore the advantage is gained that the cemented carbide material in the milling insert is not unnecessarily reduced due to the desired inclination of the main edge adjacent to the secondary edge. In such a way, the milling insert retains a good strength without the requirement of surface finish during fine milling (when the cutting depth is smaller than half of the effective length of the main edge) being neglected.

While the invention has been disclosed with reference to certain preferred embodiments, numerous modifications, alterations, and changes to the described embodiments are possible without departing from the sphere and scope of the invention, as defined in the appended claims and their equivalents thereof. For example, the shape and location of the secondary edges as well as of the shoulders may be varied within fairly wide limits. For instance, the top surface of the individual shoulder may, on one hand, be spaced apart a distance from the non-chip-removing borderline adjacent to the clearance surface of the main edge, and, on the other hand, have other shapes than exactly plane, e.g., arched or hemisphere-like. Furthermore, the invention is applicable not only to face milling inserts, but also to end mill inserts. Although the invention originates from problems that essentially relate to double-sided face milling inserts, the particular insert geometry being the solution to the problems and presented above, is also applicable to single-sided milling inserts, i.e., milling inserts that include a series of at least three cutting edges only along the upperside thereof, a plane underside forming a reference plane parallel to the upperside (in such cases, the underside may be formed with serrations or other types of coupling members). In other words, the invention should be considered to include not only double-sided milling inserts, but also single-sided inserts having only one set of indexable cutting edges, having the unique geometry described above. It should also be mentioned that the milling insert may be fixed by, e.g., clamps, wedges or the like, wherein the milling insert does not require any hole. Also, the number of cutting edges along the upperside (and the underside, respectively) may vary all the way from three and upward. Accordingly, it is intended that the invention not be limited to the described embodiments, but that it have the full scope defined by the language of the following claims.

What is claimed is:

1. A milling insert, comprising:
   an upperside, an underside, and a reference plane parallel to the upperside and the underside;
   a plurality of indexable cutting edges formed along a peripheral borderline in transitions between at least the upperside and a number of clearance surfaces,
   the cutting edges including an active chip-removing main edge and an active surface-wiping secondary edge cooperating therewith during a milling operation, the active secondary edge forming an obtuse angle with the active main edge as viewed in planar view from the upperside, and the active main edge extending across over half of the width of the insert along the reference plane from a side view facing the clearance surface corresponding to the main edge;
   the active main edge, from a first end of the active main edge adjacent to the active surface-wiping secondary edge, first declining toward the underside of the milling insert and then, from a lowest part, rising toward an opposite second end of the active main edge,
   wherein the active secondary edge is inclined at an angle ($\epsilon$) in relation to the reference plane as viewed perpendicularly to the clearance surface of the active surface-wiping secondary edge, such that a first end of the active surface-wiping secondary edge connected to the active main edge is situated on a lower level than the opposite, second end of the active surface-wiping secondary edge, and
   wherein at the second end of each main edge and at the second end of a neighboring secondary edge, the borderline is interrupted by non-chip-removing edge lines inside which shoulders are formed having top surfaces, which are located in a common plane parallel to and situated on a higher level than a plane in which the second ends of the secondary edges are commonly situated.

2. The milling insert according to claim 1, wherein the angle ($\epsilon$) amounts to at least 1°.

3. The milling insert according to claim 1, wherein the angle ($\epsilon$) amounts to at most 7°.

4. The milling insert according to claim 1, wherein the angle ($\epsilon$) amounts to at least 2° and at most 5°.

5. The milling insert according to claim 1, wherein the secondary edge has a convexly arched shape.

6. The milling insert according to claim 1, wherein the top surface of the shoulders is plane.

7. The milling insert according to claim 1, wherein the top surface extends inward from an outer edge line flush with the clearance surface of the main edge.

8. The milling insert according to claim 1, wherein insert is double-sided.

9. The milling insert according to claim 1, wherein a first portion of the main edge closest to the secondary edge is inclined at a first angle ($\gamma$) in relation to the reference plane up to a breaking point adjacent to a second portion, the angle of which to the reference plane is smaller than the first angle, the breaking point being situated closer to the secondary edge than the second end of the main edge.

10. The milling insert according to claim 1, wherein the milling insert has four cutting edges on each of the upperside and the underside, the surface-wiping secondary edges being disposed at the corners of the milling insert.

11. A milling insert, comprising:
an upperside, an underside, and a reference plane parallel to the upperside and the underside;
a plurality of indexable cutting edges formed along a peripheral borderline in transitions between at least the upperside and a number of clearance surfaces;
each cutting edge including a chip-removing main edge and a surface-wiping secondary edge, the secondary edge forming an obtuse angle with the main edge as viewed in planar view from the upperside, and the chip-removing main edge extending across over half of the width of the insert along the reference plane from a side view facing the clearance surface corresponding to the main edge;
the main edge, from a first end of the main edge adjacent to the secondary edge, first declining toward the underside of the milling insert and then, from a lowest part, rising toward an opposite second end of the main edge,
wherein the secondary edge is inclined at an angle ($\epsilon$) in relation to the reference plane as viewed perpendicularly to the clearance surface of the secondary edge, such that a first end of the secondary edge connected to the main edge is situated on a lower level than the opposite, second end of the secondary edge, and wherein at the second end of each main edge and at a second end of a neighboring secondary edge, the peripheral borderline is interrupted by non-chip-removing edge lines inside from which shoulders are formed having top surfaces, which top surfaces are located in a common plane parallel to and situated on a higher level than a plane in which the second ends of the secondary edges are commonly situated.

12. The milling insert according to claim 11, wherein the top surface extends inward from an outer edge line flush with the clearance surface of the main edge.

13. The milling insert according to claim 11, wherein the angle ($\epsilon$) amounts to at least 2° and at most 5°.

14. The milling insert according to claim 11, wherein a length of the first portion of the main edge is less than half a total length of the main edge.

15. The milling insert according to claim 11, wherein a length of the surface wiping secondary edge is within 20-30% of a total length of the main edge.

16. The milling insert according to claim 11, wherein the angle ($\epsilon$) amounts to at least 1°.

17. The milling insert according to claim 11, wherein the angle ($\epsilon$) amounts to at most 7°.

18. The milling insert according to claim 11, wherein the secondary edge has a convexly arched shape.

19. The milling insert according to claim 11, wherein insert is double-sided.

20. The milling insert according to claim 11, wherein a first portion of the main edge closest to the secondary edge is inclined at a first angle ($\gamma$) in relation to the reference plane up to a breaking point adjacent to a second portion, the angle of which to the reference plane is smaller than the first angle, the breaking point being situated closer to the secondary edge than the second end of the main edge.

* * * * *